H. SCHULTZ.
MEANS FOR FORMING PARALLEL FACES ON THE ENDS OF RAILS, &c.
APPLICATION FILED APR. 12, 1910.
981,695.
Patented Jan. 17, 1911.
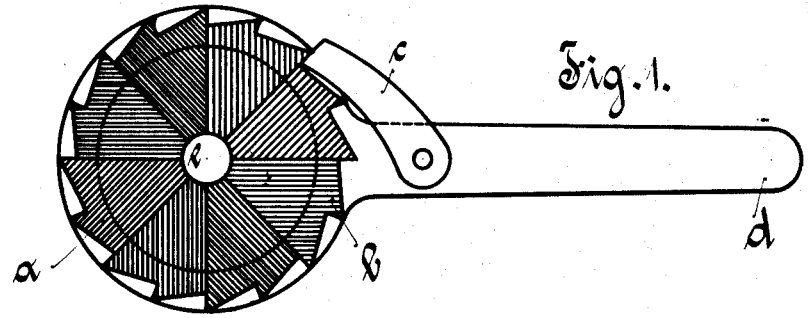
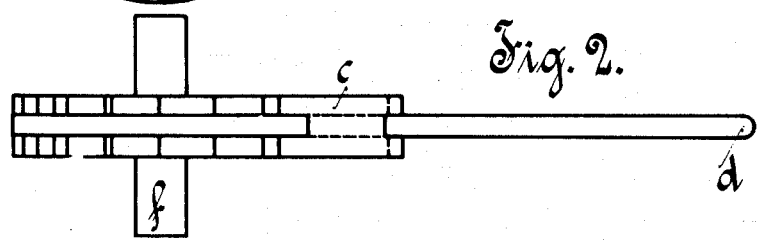
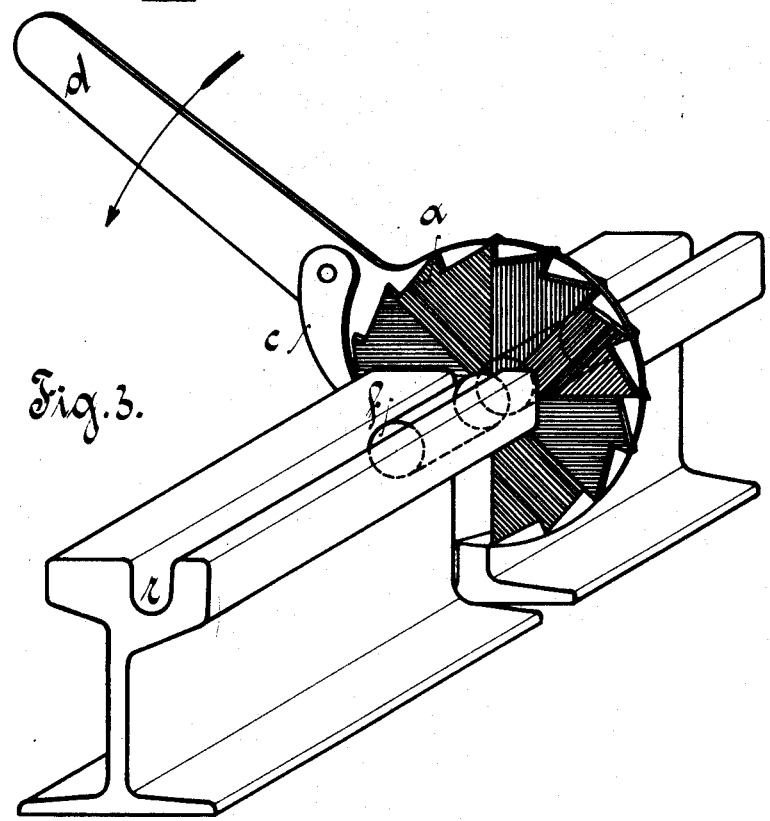
Witnesses:
Chas. F. Clagett
K. M. Cassidy
Inventor,
Hermann Schultz
by
Chas. F. Dane
Attorney

UNITED STATES PATENT OFFICE.

HERMANN SCHULTZ, OF ESSEN-ON-THE-RUHR, GERMANY, ASSIGNOR TO THE FIRM OF TH. GOLDSCHMIDT, OF ESSEN-ON-THE-RUHR, GERMANY.

MEANS FOR FORMING PARALLEL FACES ON THE ENDS OF RAILS, &c.

981,695.   Specification of Letters Patent.   Patented Jan. 17, 1911.

Application filed April 12, 1910. Serial No. 554,995.

*To all whom it may concern:*

Be it known that I, HERMANN SCHULTZ, technical engineer, a subject of the King of Prussia, German Emperor, and a resident of Essen-on-the-Ruhr, in the German Empire, have invented a new and useful Means for Forming Parallel Faces on the Ends of Rails, &c., of which the following is an exact specification.

My invention relates to a means for forming parallel faces on the ends of rails, etc., the main object of the invention being to provide a means for accomplishing this result.

The invention is especially applicable to the preparation of the ends of rails, bars, etc., for welding together, particularly for butt-welding by the alumino-thermic process. It is of the utmost importance in welding rails, etc., together, and especially in butt-welding them by the use of thermit, that the surfaces to be welded be perfectly smooth and parallel in order that they may be in close contact with each other at all points in their abutting surfaces. The means which I employ with good results for obtaining the desired parallelism of the abutting faces of rails, etc., is a free rotary cutter having at its sides parallel cutting or filing faces constructed to have a turning or step-by-step movement for cutting or filing the end surfaces to be faced, and having a periphery free from cutting surfaces. When grooved rails are to be brought into condition for welding the cutter is mounted on a pin passing through its center, which pin rests in the groove of the rails at the adjacent ends thereof. The pin, of course, may also rest in any other part of the rails, whether they be grooved rails or Vignole-rails. This and other features of the invention not hereinbefore referred to will be hereinafter described and claimed and are illustrated in the accompanying drawings, in which—

Figure 1 is a side elevation of one type of means for simultaneously truing or facing the ends of a pair of rails to bring them into parallelism; Fig. 2 is a plan of the same, and Fig. 3 is a perspective of the same in operative relation with and between the ends of a pair of rails.

In carrying my invention into effect I prefer to make use of a free cutter or file body substantially such as shown at $a$ which has at its opposite sides parallel cutting or filing teeth. The body of the cutter is so formed as to constitute at its center a ratchet wheel $b$, which ratchet-wheel is adapted to be turned by suitable devices, preferably a pawl $c$ and a lever $d$ on which said pawl is mounted, the cutter faces turning as the ratchet-wheel is turned. The combined cutter and ratchet-wheel is illustrated as having a central journal opening $e$ through which passes a pin $f$ the ends of which project freely and are adapted to rest in the grooves $r$ of a pair of rails when the rails to be welded are of the grooved type. The pin $f$, projecting on opposite sides, constitutes free centers or arbors projecting from the faces of the cutter. Pointed centers may be used for certain classes of work. The manner in which the means just described is operatively mounted with respect to the rails to be faced is clearly illustrated in Fig. 3. The lever $d$ may be any suitable for the purpose and may be connected with the cutter and ratchet-wheel in any desired manner. I prefer, however, to construct and support it in the manner illustrated, that is to say, by providing in the periphery of the rotary member a substantially central circumferential groove the back wall of which constitutes a journal surface on which the lever is mounted to turn. This groove in the rotary member thus divides the ratchet-wheel into two parts, each of which has its circuit of ratchet-teeth, the pawl $c$ being so constructed as to coöperate with both sets of ratchet-teeth at the same time. The movement of the filing body may, of course, be also supplied by any other device, for instance by a steel hoop etc.

The cutter or file proper may be of any suitable construction, being made either entirely of steel in a single piece or having a body portion of iron with interchangeable cutter disks of steel fastened to the body portion, as may be desired. In each case, however, the rotary member will have parallel cutting faces at its opposite sides and will constitute a duplex cutter or file adapted for simultaneously operating upon the ends of both of the rails to be faced.

When the rails or other parts are to be faced the cutter and its carrying means will be placed between the ends of the rails in the position shown in Fig. 3, the cutters being turned about the fulcrum-pin $f$ by the lever $d$ and the devices operated thereby and the rail ends being preferably simultaneously forced up to the cutters, it being understood that one of both of the rails will be so held in suitable guides or clamps as to permit at least one of the rails to be moved toward the cutters.

What I claim is:

1. A cutting device for forming uniform parallel end faces on the abutting ends of two articles, said device comprising a rotary member having parallel lateral cutting faces, free centers projecting from said member for engagement with work pieces, and means for imparting driving impulse to said member.

2. A cutting device comprising a rotary member having oppositely facing lateral cutting faces, free arbor centers projecting from said member for engagement with work pieces, and means for imparting driving impulse to said member.

3. A cutting device comprising a duplex cutter having at its opposite sides lateral cutting faces, and also having an intermediate journal portion, free centers projecting from said member for engagement with work pieces, a ratchet wheel in fixed relation to the cutter, and a pawl and lever device for turning said ratchet and cutter, said lever being mounted on said journal portion of the cutter.

4. A cutting device comprising a rotary member having lateral cutting faces, free centers projecting from said member for engagement with work pieces, and means engaging the cutter body circumferentially for imparting driving impulse thereto.

5. A cutting device comprising a duplex cutter having at its opposite sides lateral cutting faces, and also having an intermediate journal portion, a ratchet wheel in fixed relation to the cutter, and a pawl and lever devices for turning said ratchet and cutter, said lever being mounted on said journal portion of the cutter.

6. A cutting device comprising a duplex cutter having at its opposite sides lateral cutting faces, and also having two circuits of like peripheral ratchet teeth separated by a peripheral groove forming an intermediate journal, a lever mounted on said journal of the cutter between said circuits of ratchet teeth, and a pawl carried by the lever for engaging said ratchet teeth and turning the cutter.

7. A cutting device comprising a free rotary cutting member having oppositely facing lateral cutting surfaces and a periphery free from cutting surfaces, and means embracing said periphery and adapted to engage the same for imparting driving impulse thereto.

8. A cutting device comprising a free rotary cutting member having oppositely facing lateral cutting surfaces and a periphery free from cutting surfaces, and means adapted to engage said cutting member at its periphery for imparting driving impulse thereto.

9. Means for forming parallel faces on the abutting ends of rails or other articles to be welded or otherwise joined together, comprising a free rotary cutter having at its opposite sides parallel cutting surfaces and a periphery free from cutting surfaces, means for supporting the cutter in cutting position, and means for engaging the cutter at its periphery for imparting driving impulse thereto.

In witness whereof I have hereunto set my hand in the presence of two witnesses.

HERMANN SCHULTZ.

Witnesses:
IRVING B. DUDLEY,
C. W. WURTZER.